Figure 1:
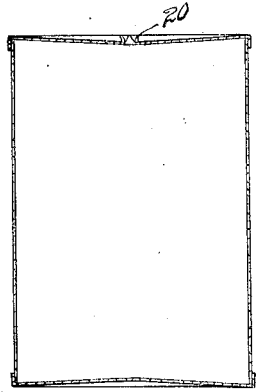

C. E. ROGERS.
METHOD OF SEALING METAL CANS.
APPLICATION FILED JUNE 3, 1912.

1,070,735.

Patented Aug. 19, 1913.

WITNESSES.
Richard Alspar
Selene McDonald

INVENTOR.
CHARLES E. ROGERS
By Charles E. Wiener
Attorney.

UNITED STATES PATENT OFFICE.

CHARLES E. ROGERS, OF DETROIT, MICHIGAN.

METHOD OF SEALING METAL CANS.

1,070,735.  Specification of Letters Patent.  Patented Aug. 19, 1913.

Application filed June 3, 1912. Serial No. 701,174.

*To all whom it may concern:*

Be it known that I, CHARLES E. ROGERS, a citizen of the United States, residing at Detroit, county of Wayne, State of Michigan, have invented a certain new and useful Improvement in Methods of Sealing Metal Cans, and declare the following to be a full, clear, and exact description of the same, such as will enable others skilled in the art to which it pertains to make and use the same, reference being had to the accompanying drawings, which form a part of this specification.

This invention relates to a method of sealing metal cans.

The can is of that type usually used in the packaging of liquids, and in the cans ordinarily in use for this purpose the opening in the can end, through which the material to be preserved is introduced, is either formed by a punch which displaces the material and leaves it projecting into the interior of the can, or by cutting out a portion at the center of the can end.

In sealing cans having a filling aperture formed in the first mentioned manner, the aperture is closed by a drop of solder and the soldering operation is usually performed by an automatic device for such purpose. A difficulty arises in soldering cans of this form by reason of the fact that upon applying the soldering iron to the aperture, even for a brief period of time, the air in the can expands and blows the solder from the aperture, or, if the can top be heated prior to the soldering operation in a manner to exhaust the air from the can, the atmospheric pressure may force a part or all of the solder into the can.

If the filling aperture be formed by the second method mentioned, which is the method used in forming the larger openings, the aperture is closed by a cap or patch which is generally provided with a vent. In this case the cap is first soldered into place and the vent then closed by a drop of solder and the same difficulty arises in this method as is described in the first mentioned method. This difficulty has heretofore been a serious obstacle to a rapid, continuous and automatic sealing of the cans, and an object of this invention is a method of sealing cans in which the above mentioned difficulty is obviated. The can with which this method may be conveniently used is formed with a filling aperture having the projections, produced by displacing the material to form the aperture, extending outwardly from the can body whereby they are in a position to be forced back into the aperture and then soldered in place. As hereinafter shown such method of sealing the can effectually overcomes the above mentioned difficulty and the labor involved in inspecting the cans after passing from the soldering apparatus and the sealing by hand of such as are not properly sealed thereby is reduced to a minimum. These and further objects and novelties of the invention are hereinafter more fully described and claimed and shown in the accompanying drawings, in which—

Figure 3:
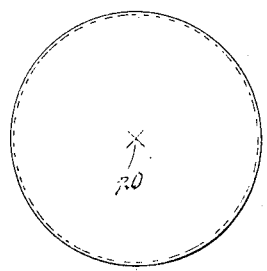
Figure 2:
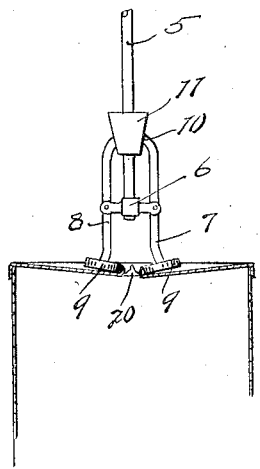

Figure 1 is a sectional view of a can having a filling aperture formed by displacing the material to project exteriorly of the can. Fig. 2 is a diagrammatic view illustrative of a method and means by which the material displaced in forming the aperture may be forced into position therein. Fig. 3 is a plan view of a can top illustrating the appearance thereof after the displaced metal has been forced into position in the aperture.

Similar characters refer to similar parts throughout the drawings and specification.

In the can herein shown the top is punched, prior to its being secured to the body, in such manner as to leave the displaced material projecting exteriorly of the can when assembled with the body and therefore upon that side of the top opposite the flange formed thereon as shown in Fig. 1. These openings vary in size for different purposes, in some instances being less than an eighth of an inch in diameter, and, as indicated in Fig. 1, the displaced metal tends to roll back away from the opening and the displacement of the material in this manner, therefore, does not in any way interfere with the insertion of the filling tube into the opening in the usual way. The punch usually used in forming such openings is so shaped that the metal displaced is in the form of four prongs and in so forming the opening the displaced metal is stretched so that, if forced back into its original position as nearly as may be, the opening is very nearly completely closed, the spaces between the prongs 20 being barely perceptible as may be inferred from Fig. 3.

One of many efficient methods of forcing the metal back into place is indicated somewhat diagrammatically in Fig. 2, in which is shown a revoluble shaft 5 upon the lower end of which is attached the head 6, upon opposite ends of the arms of which are pivotally supported the vertically disposed arms 7 and 8. The lower end of each arm is provided with a tool steel roller 9, and the upper end of each arm is provided with a cam face 10 normally engaging the surface of the cone-shaped member 11, rotatable with the shaft and reciprocatable thereon. The tool is shown in its normal position with the rollers in contact with the displaced material surrounding the aperture in the can top and by rotating the shaft 5 these rollers rotate about the displaced material and by forcing the cone-shaped cam downwardly on the shaft during such rotation the rollers 9 are gradually forced together under which action the displaced material is gradually rolled back into place in the opening in practically its original position thereby nearly closing the opening with the exception of the practically imperceptible slits between the prongs 20 as is indicated in Fig. 3. The prongs may also be forced back into position by hand if so desired and when in this position solder may be placed on the can top to effectually seal the can without a possibility of a displacement of the solder by "blowing" by reason of the fact that the area of solder open to such influence is so minute as to be practically unaffected by any slight excess of pressure of air either exterior or interior of the can.

While I have shown and described the aperture as being formed by displacing material in the shape of four prongs it is to be understood that the material may be cut to form a greater or less number of prongs or cut in any other form suitable for the purpose, the essential requirement being that the displaced material shall be of such shape and in such condition as to be readily forced into the aperture in substantially its original position for the purpose described.

The cost of sealing the can herein shown is considerably less than the cost involved in sealing in the usual manner, as not only is the labor cost materially lessened, as all the cans are properly sealed in passing through the soldering apparatus and the labor of inspection and of re-soldering imperfectly sealed cans reduced to a minimum, but a saving in material is effected by reason of the small amount of solder required and that no patch or plug is used to fill the opening prior to the soldering operation.

Having thus briefly described my invention, what I claim and desire to secure by Letters Patent of the United States is—

1. A method of sealing metal cans consisting in forming a filling aperture by displacing the material to project exteriorly of the can in the shape of prongs and subsequently forcing the projecting prongs to substantially their original position and soldering them in place.

2. A method of sealing metal cans consisting in providing a filling aperture by slitting the material to form converging prongs which project exteriorly of the can in a group surrounding the aperture, and subsequently forcing the projecting prongs to substantially their original converging position and soldering them in place.

3. The method of sealing metal cans consisting in forming a filling aperture by displacing the material in a manner to project exteriorly of the can circumferentially about the aperture and subsequently replacing the material thus displaced and covering the affected area with solder.

4. A method of sealing metal cans consisting in forming a filling aperture by slitting and displacing the material in a manner to project exteriorly of the can circumferentially about the aperture and subsequently replacing the displaced material and securing it in substantially its original position by the use of a sealing medium.

5. A method of sealing metal cans consisting in forming a filling aperture by displacement of the material to project exteriorly of the can circumferentially about the aperture, subsequently, partially closing the aperture by use of the material and completing the closing thereof by the use of a sealing medium.

6. A method of sealing metal cans consisting in forming a filling aperture by displacing the material in a manner to project exteriorly of the can surrounding the aperture, subsequently forcing said material into the aperture progressively from the periphery toward the center thereof and then soldering it in place.

In testimony whereof, I sign this specification in the presence of two witnesses.

CHARLES E. ROGERS.

Witnesses:
  CHARLES E. WISNER,
  CHARLES A. ROGERS.